(12) United States Patent
Ostendorf

(10) Patent No.: US 12,110,393 B2
(45) Date of Patent: Oct. 8, 2024

(54) CROSSLINKABLE ORGANOPOLYSILOXANE COMPOSITIONS

(71) Applicant: WACKER CHEMIE AG, Munich (DE)

(72) Inventor: Detlev Ostendorf, Dresden (DE)

(73) Assignee: WACKER CHEMIE AG, Munich (DE)

( * ) Notice: Subject to any disclaimer, the term of this patent is extended or adjusted under 35 U.S.C. 154(b) by 790 days.

(21) Appl. No.: 17/268,433

(22) PCT Filed: Aug. 17, 2018

(86) PCT No.: PCT/EP2018/072355
§ 371 (c)(1),
(2) Date: Feb. 12, 2021

(87) PCT Pub. No.: WO2020/035151
PCT Pub. Date: Feb. 20, 2020

(65) Prior Publication Data
US 2021/0347952 A1    Nov. 11, 2021

(51) Int. Cl.
| | |
|---|---|
| C08L 83/04 | (2006.01) |
| C08G 77/12 | (2006.01) |
| C08G 77/18 | (2006.01) |
| C08G 77/20 | (2006.01) |
| C08G 77/24 | (2006.01) |
| C08G 77/26 | (2006.01) |
| C08G 77/00 | (2006.01) |

(52) U.S. Cl.
CPC .............. *C08L 83/04* (2013.01); *C08G 77/12* (2013.01); *C08G 77/18* (2013.01); *C08G 77/20* (2013.01); *C08G 77/24* (2013.01); *C08G 77/26* (2013.01); *C08G 77/70* (2013.01); *C08G 77/80* (2013.01)

(58) Field of Classification Search
None
See application file for complete search history.

(56) References Cited

U.S. PATENT DOCUMENTS

| | | |
|---|---|---|
| 6,310,146 B1 | 10/2001 | Katsoulis et al. |
| 6,689,859 B2 | 2/2004 | Li et al. |
| 8,927,673 B2 | 1/2015 | Hwang et al. |
| 9,688,822 B2 * | 6/2017 | Suto ................. C09J 183/04 |
| 2008/0318067 A1 | 12/2008 | Itoh et al. |
| 2011/0177342 A1 | 7/2011 | Itoh et al. |
| 2012/0065343 A1 * | 3/2012 | Bahadur ................. C08L 83/04 525/478 |
| 2015/0322211 A1 * | 11/2015 | Akiyama ................. C08L 83/04 528/15 |
| 2018/0334567 A1 * | 11/2018 | Kawamura ............. H01L 33/56 |
| 2020/0002534 A1 * | 1/2020 | Mizunashi ............. C08G 77/44 |

FOREIGN PATENT DOCUMENTS

| | | | |
|---|---|---|---|
| EP | 0110370 A1 | 6/1984 | |
| JP | 2011246680 A | 12/2011 | |
| WO | WO-2009111199 A1 * | 9/2009 | ............ B32B 17/04 |
| WO | 14065432 A1 | 5/2014 | |

\* cited by examiner

Primary Examiner — Marc S Zimmer
(74) Attorney, Agent, or Firm — BROOKS KUSHMAN P.C.

(57) ABSTRACT

Organopolysiloxane mixtures curable by hydrosilylation include MT organopolysiloxanes having 10 to 20 siloxy units and containing a fraction of 0.15 to 0.24 M units based on total siloxy units in the organopolysiloxane, and a polydispersity of 1.05 to 1.40, a hydrosilylation catalyst, and an Si—H-functional organopolysiloxane are curable to vulcanizates with elastic moduli which may be greater than 0.5 GPa.

12 Claims, No Drawings

CROSSLINKABLE ORGANOPOLYSILOXANE COMPOSITIONS

CROSS REFERENCE TO RELATED APPLICATIONS

This application is the U.S. National Phase of PCT Appln. No. PCT/EP2018/072355 filed Aug. 17, 2018, the disclosure of which is incorporated in its entirety by reference herein.

BACKGROUND OF THE INVENTION

1. Field of the Invention

The invention relates to hydrosilylation-crosslinkable organopolysiloxane compositions, to processes for the production thereof, to the use thereof, and to vulcanizates obtainable therefrom.

2. Description of the Related Art

Organopolysiloxane resins containing reactive units having aliphatic carbon-carbon multiple bonds may be crosslinked with suitable couplers having two Si—H groups or with suitable crosslinkers having at least three Si—H groups in the presence of—usually platinum-containing—catalysts by a hydrosilylation/addition reaction. U.S. Pat. Nos. 6,689,859 and 6,310,146 describe vulcanizate properties of mixtures of a silsesquioxane copolymer having an average composition $(PhSiO_{3/2})_{0.75}(ViMe_2SiO_{1/2})_{25}$ and divalent Si—H couplers, such as diphenylsilane (U.S. Pat. No. 6,689,859, sample 1), 1,1,3,3,5,5-hexamethyltrisiloxane (U.S. Pat. No. 6,689,859, sample 5) and 1,4-bis(dimethylsilyl)benzene (U.S. Pat. No. 6,310,146, example 1), which are crosslinked in the presence of a platinum catalyst. The disadvantage of the vulcanized mixtures is that they exhibit either a low elastic modulus or brittle fracture behavior, a consequence of relatively low flow characteristics of the polymer network. The low flow characteristics and the consequent relatively low fracture toughness of the material are also identifiable in a compression test curve by a high value for the flow ratio.

U.S. Pat. No. 8,927,673 describes a simple process for the targeted production of ladder-like or cage-like polysilsesquioxanes by base-catalyzed hydrolysis and polymerization of trialkoxysilanes in an organic solvent. Examples for the synthesis of copolymers are also reported, for example by hydrolysis and cocondensation of phenyltrimethoxysilane and 3-acryloxypropyltrimethoxysilane (example 13, paragraph [0084]). However, a disadvantage of this process is that the weight-average Mw of the "ladder-like" polysilsesquioxanes is adjustable by the reaction conditions only to a limited extent, and the polysilsesquioxanes obtained therefore have a rather high weight-average Mw and broad molecular weight distribution, apparent from the high polydispersity Mw/Mn of more than 2. Options for copolymerizing trialkoxyorganosilanes with monoalkoxytriorganosilanes for precise control of the weight-average Mw are not disclosed in U.S. Pat. No. 8,927,673. WO 2014/065432 A1 describes a hydrosilylation-crosslinkable composition.

US 2011/177342 A1 and US 2008/318067 A1 describe hydrosilylation-crosslinkable compositions.

SUMMARY OF THE INVENTION

The present invention provides hydrosilylation-crosslinkable compositions containing (A) organopolysiloxanes containing units of formulae

$$R_2R^1SiO_{1/2} \quad (I)$$

and

$$R^2(OR^3)_aSiO_{(3-a)/2} \quad (II),$$

wherein
R may be identical or different and represents hydrocarbon radicals free from aliphatic carbon-carbon multiple bonds,
$R^1$ represents monovalent hydrocarbon radicals having aliphatic carbon-carbon multiple bonds,
$R^2$ represents aromatic hydrocarbon radicals free from aliphatic carbon-carbon multiple bonds,
$R^3$ may be identical or different and represents hydrogen or alkyl and
a is 0, 1 or 2,
with the proviso that
in the organopolysiloxanes (A) the sum of the units of formula (I), based on the sum of all units of formulae (I) and (II), is 0.15 to 0.24, preferably 0.17 to 0.23,
in the organopolysiloxanes (A) the sum of the units of formula (II) where a>0, based on the sum of all units of formulae (I) and (II), is not more than 0.08, and
organopolysiloxanes (A) contain an average of 10 to 20, more silicon atoms,
organopolysiloxanes (A) have a polydispersity Mw/Mn of 1.05 to 1.40 and
organopolysiloxanes (A) have an average number of radicals $R^1$ per molecule, reported in mol($R^1$)/mol, of 1.1 to 3.8,
(B) organosilicon compounds having two Si-bonded hydrogen atoms and
(C) catalysts which promote addition of Si-bonded hydrogen onto an aliphatic multiple bond.

DETAILED DESCRIPTION OF THE PREFERRED EMBODIMENTS

The present invention provides hydrosilylation-crosslinkable compositions containing (A) organopolysiloxanes containing units of formulae

$$R_2R^1SiO_{1/2} \quad (I)$$

and

$$R^2(OR^3)_aSiO_{(3-a)/2} \quad (II),$$

wherein
R may be identical or different and represents hydrocarbon radicals free from aliphatic carbon-carbon multiple bonds,
$R^1$ represents monovalent hydrocarbon radicals having aliphatic carbon-carbon multiple bonds,
$R^2$ represents aromatic hydrocarbon radicals free from aliphatic carbon-carbon multiple bonds,
$R^3$ may be identical or different and represents hydrogen or alkyl and
a is 0, 1 or 2, preferably 0 or 1,
with the proviso that
in the organopolysiloxanes (A) the sum of the units of formula (I), based on the sum of all units of formulae (I) and (II), is 0.15 to 0.24, preferably 0.17 to 0.23, more preferably 0.18 to 0.22,
in the organopolysiloxanes (A) the sum of the units of formula (II) where a>0, based on the sum of all units of formulae (I) and (II), is not more than 0.08, preferably not more than 0.06, more preferably not more than 0.04, and particular not more than 0.02, organopolysiloxanes (A) contain an average of 10 to 20, preferably 11 to 18, more preferably 12 to 17, silicon atoms, organopolysiloxanes (A) have a polydispersity Mw/Mn of 1.05 to 1.40 and organopolysiloxanes (A) have an average number of radicals $R^1$ per molecule, reported in mol($R^1$)/mol, of 1.1 to 3.8, preferably 1.5 to 3.5, more preferably 1.8 to 3.3, in particular of 2.0 to 3.0, (B) organosilicon compounds having two Si-bonded hydrogen atoms, and (C) catalysts which promote addition of Si-bonded hydrogen onto an aliphatic multiple bond.

Radical R is preferably methyl or phenyl, preferably methyl.

Radical $R^1$ is preferably vinyl, bicycloheptenyl, 3a,4,5,6,7,7a-hexahydro-4,7-methano-1H-indenyl or 2-propenyl, more preferably vinyl.

Radical $R^2$ is preferably phenyl, o-, m- or p-tolyl or benzyl, more preferably phenyl.

Radical $R^3$ is preferably hydrogen, methyl or ethyl, more preferably hydrogen.

Component (A) employed according to the invention is preferably selected from organopolysiloxanes consisting of units of formulae $$R_2R^1SiO_{1/2} \quad (V),$$

$$R^2SiO_{3/2} \quad (VI)$$

and optionally units selected from the group consisting of units of formulae $$R^2(OR^3)SiO_{2/2} \quad (VII) \text{ and}$$

$$R^2(OR^3)_2SiO_{1/2} \quad (VIII),$$

wherein R, $R^1$, $R^2$ and $R^3$ have one of the abovementioned definitions, with the proviso that in the organopolysiloxanes (A) the sum of the units of formula (V), based on the sum of all units of formulae (V), (VI), (VII) and (VIII), is 0.15 to 0.24, preferably 0.17 to 0.23, more preferably 0.18 to 0.22, in the organopolysiloxanes (A) the sum of the units of formulae (VII) and (VIII), based on the sum of all units of formulae (V), (VI), (VII) and (VIII), is not more than 0.08, preferably not more than 0.06, more preferably not more than 0.04, and in particular not more than 0.02, organopolysiloxanes (A) contain an average of 10 to 20, preferably 11 to 18, more preferably 12 to 17, silicon atoms, organopolysiloxanes (A) have a polydispersity Mw/Mn of 1.05 to 1.40, organopolysiloxanes (A) have an average number of radicals $R^1$ per molecule, reported in mol($R^1$)/mol, of 1.5 to 3.0, preferably 1.8 to 2.8, more preferably 2.0 to 2.6, and organopolysiloxanes (A) have an average number of radicals $R^1$ per molecule, reported in mol ($R^1$)/mol, of 1.1 to 3.8, preferably 1.5 to 3.5, more preferably 1.8 to 3.3, and in particular of 2.0 to 3.0.

The invention further provides organopolysiloxanes consisting of units of formulae $$R_2R^1SiO_{1/2} \quad (V),$$

$$R^2SiO_{3/2} \quad (VI)$$

and optionally units selected from the group consisting of units of formulae $$R^2(OR^3)SiO_{2/2} \quad (VII) \text{ and}$$

$$R^2(OR^3)_2SiO_{1/2} \quad (VIII),$$

wherein R, $R^2$, $R^2$ and $R^3$ have one of the abovementioned definitions, with the proviso that in the organopolysiloxanes (A) the sum of the units of formula (V), based on the sum of all units of formulae (V), (VI), (VII) and (VIII), is 0.15 to 0.24, preferably 0.17 to 0.23, more preferably 0.18 to 0.22, in the organopolysiloxanes (A) the sum of the units of formulae (VII) and (VIII), based on the sum of all units of formulae (V), (VI), (VII) and (VIII), is not more than 0.08, preferably not more than 0.06, more preferably not more than 0.04, and in particular not more than 0.02, organopolysiloxanes (A) contain an average of 10 to 20, preferably 11 to 18, more preferably 12 to 17, silicon atoms, organopolysiloxanes (A) have a polydispersity Mw/Mn of 1.05 to 1.40 and organopolysiloxanes (A) have an average number of radicals $R^2$ per molecule, reported in mol($R^1$)/mol, of 1.1 to 3.8, preferably 1.5 to 3.5, more preferably 1.8 to 3.3, and in particular of 2.0 to 3.0.

The organopolysiloxanes (A) employed according to the invention by preference have a weight-average Mw of 1000 to 2100 g/mol, more preferably of 1150 to 1900 g/mol, most preferably of 1350 to 1850 g/mol.

The organopolysiloxanes (A) employed according to the invention by preference have a number-average Mn of 1100 to 1500 g/mol, more preferably of 1100 to 1450 g/mol, most preferably of 1150 to 1400 g/mol.

The organopolysiloxanes (A) employed according to the invention preferably have a polydispersity Mw/Mn of 1.05 to 1.30, more preferably of 1.05 to 1.25, and in particular of 1.10 to 1.20.

Examples of preferred organopolysiloxanes (A) are $(PhSiO_{3/2})_{0.79}(MePhViSiO_{1/2})_{0.21}$;
where Mw=1730 g/mol, Mn=1380 g/mol and Mw/Mn=1.25; $(PhSiO_{3/2})_{0.78}(Me_2ViSiO_{1/2})_{0.22}$;
where Mw=1480 g/mol, Mn=1240 g/mol and Mw/Mn=1.19; and $(PhSiO_{3/2})_{0.80}(Me_2ViSiO_{1/2})$ 0.20;
where Mw=1600 g/mol, Mn=1310 g/mol and Mw/Mn=1.22;
wherein Me is methyl, Vi is vinyl and Ph is phenyl.

The aliphatically unsaturated organopolysiloxanes (A) are more preferably those produced by reaction (process A) of
(i) organylalkoxysilanes of general formulae $$R_2R^1(OR^3)Si \quad (III)$$

and $$R^2(OR^3)_3Si \quad (IV),$$

wherein R, $R^1$, $R^2$ and $R^3$ are as defined above,
with
(ii) water in amounts of 1.0 to 10.0 mol, preferably of 2.0 to 5.0 mol, more preferably of 2.5 to 4.0 mol, and in particular of 2.9 to 3.5 mol, in each case based on 1 mol of organylalkoxysilane (i) of formula (IV),
in the presence of
(iii) base, preferably in amounts of 0.01 to 5.0 parts by weight, more preferably of 0.05 to 2.0 parts, yet more preferably 0.1 to 1.5 parts, and in particular 0.2 to 1.0 part, in each case based on 100 parts of organylalkoxysilanes (i) of formula (IV),
optionally in the presence of
(iv) water-miscible organic solvents.

Examples of organylalkoxysilane (i) of formula (IV) are phenyltrimethoxysilane, phenyltriethoxysilane, o-, m- or p-tolyltrimethoxysilane, o-, m- or p-tolyltriethoxysilane, benzyltrimethoxysilane and benzyltriethoxysilane, wherein phenyltrimethoxysilane is preferred.

Examples of organylalkoxysilanes (i) of formula (III) are dimethyl(vinyl)methoxysilane, dimethyl(vinyl)ethoxysilane, dimethyl(bicycloheptenyl)methoxysilane, dimethyl (bicycloheptenyl)ethoxysilane, dimethyl(3a,4,5,6,7,7a-hexahydro-4,7-methano-1H-indenyl)methoxysilane, dimethyl(3a,4,5,6,7,7a-hexahydro-4,7-methano-1H-indenyl)ethoxysilane, methyl(phenyl) (vinyl)methoxysilane, methyl(phenyl) (vinyl)ethoxysilane, (2-propenyl)dimethylmethoxysilane, (2-propenyl)dimethylethoxysilane, wherein methyl(phenyl) (vinyl)methoxysilane, methyl(phenyl) (vinyl)ethoxysilane, dimethyl(vinyl)methoxysilane or dimethyl(vinyl)ethoxysilane are preferred.

Examples of water (ii) are natural waters such as rain water, groundwater, spring water, river water and sea water, chemical waters, for example demineralized water, distilled water or (multiply) redistilled water, water for medicinal or pharmaceutical purposes, for example purified water (aqua purificata; Pharm. Eur. 3), aqua deionisata, aqua destillata, aqua bidestillata, aqua ad injectionam or aqua conservata, drinking water according to the German Drinking Water Ordinance and mineral water.

Examples of bases (iii) are alkali metal and alkaline earth metal hydroxide, alkali metal and alkaline earth metal carbonate, alkali metal and alkaline earth metal hydrogencarbonate, alkali metal and alkaline earth metal alkoxide, amidines such as 1,4,5,6-tetrahydropyrimidine, 1,5-diazabicyclo[4.3.0]non-5-ene (DBN), 1,8-diazabicyclo[5.3.0]dec-7-ene, 1,8-diazabicyclo[5.4.0]undec-7-ene (DBU); iminoureas, such as guanidine, N-methylguanidine, N,N'-dimethylguanidine, N,N,N',N'-tetramethylguanidine (TMG), 1-phenylguanidine, 1,5,7-triazabicyclo[4.4.0]dec-5-ene (TBD) and 7-methyl-1,5,7-triazabicyclo(4.4.0)dec-5-ene.

The bases (iii) are preferably TMG, TBD, alkali metal or alkaline earth metal carbonate, or alkali metal or alkaline earth metal hydrogencarbonate, wherein alkali metal carbonates are particularly preferred, in particular potassium carbonate or cesium carbonate.

If solvents (iv) are employed for the production of the organopolysiloxanes (A) by process A, these are preferably organic solvents in which at 20° C. and 1013 hPa at least 10% by weight, preferably at least 30% by weight, more preferably at least 50% by weight, and in particular unlimited amounts, of water (ii) may be dissolved.

If solvents (iv) are employed for the production of the organopolysiloxanes (A) by process A, these are more preferably ketones such as acetone, ethyl methyl ketone, diethyl ketone, cyclohexanone; nitriles such as acetonitrile, 3-methoxypropionitrile; acetals such as methylal, 1,3-dioxolane and 1,3,5-trioxane and glycerol formal; esters such as ethylene glycol diacetate, gamma-butyrolactone, 2-methoxy-1-propyl acetate, 1-methoxy-2-propyl acetate, methyl acetoacetate, ethyl acetoacetate, and methyl acetate; ethers such as tetrahydrofuran, 2-methyltetrahydrofuran, ethyl methyl ether, 1,4-dioxane, tetrahydropyran, and di-, tri- or tetraethylene glycol dimethyl ether; dimethyl sulfoxide; or mixtures thereof.

If solvents (iv) are employed for the production of the organopolysiloxanes (A) by process A, these are more preferably ketones such as acetone, ethyl methyl ketone, diethyl ketone, or cyclohexanone, and nitriles such as acetonitrile and 3-methoxypropionitrile; in particular acetone and acetonitrile, and also mixtures thereof.

It is preferable when solvents (iv) are employed for the production of the organopolysiloxanes (A) by process A.

The organopolysiloxanes (A) employed according to the invention are obtained by process A by hydrolysis of the organylalkoxysilanes (i) of formulae (III) and (IV) with water (ii) and cocondensation, optionally in solvent (iv), in the presence of a base (iii). Production of the organopolysiloxanes (A) employed according to the invention may be carried out such that initially the mixture of organylalkoxysilane (i) of formula (IV) and water (ii) is admixed with sufficient solvent (iv) to form a homogeneous mixture, then base (iii) is added and subsequently—either upon onset of clouding or after a certain reaction time, for example after 45 minutes—organylalkoxysilane (i) of formula (III) is added. However, alternatively base (iii) may also be premixed with water (ii) and/or solvent (iv) in process A. It is also possible to first provide an initial charge of a homogeneous mixture of organylalkoxysilanes (i) of formulae (III) and (IV), water (ii) and solvent (iv), to which base (iii) is subsequently added, or base (iii) is added as a mixture with water (ii) and/or solvent (iv).

It is also possible, but not preferred, to employ a smaller amount of solvent (iv), so that the reaction mixture is not homogeneous but rather consists of an organic phase and an aqueous phase.

Production of the organopolysiloxanes (A) according to the invention by process A by preference employs 2.0 to 5.0 mol, more preferably 2.5 to 4.5 mol, yet more preferably 2.8 to 4.0 mol, and in particular 3.0 to 3.5 mol, of organylalkoxysilanes (i) of formula (IV) per mol of organylalkoxysilane (i) of formula (III).

A preferred embodiment of process A comprises initially charging organosilicon compounds (i) of formulae (III) and (IV) and optionally solvent (iv) and subsequently adding a mixture of base (iii) with water (ii).

A further preferred embodiment of process A comprises initially charging organylalkoxysilane (i) of formula (IV) and optionally solvent (iv), then adding a mixture of base (iii) and water (ii) and subsequently adding organylalkoxysilane (i) of formula (III).

A further preferred embodiment of process A comprises initially charging optionally solvent (iv), water (ii) and base (iii), then consecutively adding, optionally as a mixture with solvent (iv), organylalkoxysilane (i) of formula (IV) and then organylalkoxysilane (i) of formula (III).

Production of the organopolysiloxanes (A) employed according to the invention is preferably carried out at temperatures in the range from −20° C. to 100° C., more preferably at temperatures in the range from −10° C. to 90° C., yet more preferably at temperatures in the range from 0° C. to 80° C., and in particular at temperatures in the range from 10° C. to 60° C. It is very preferable to mix at the temperature that results when mixing at ambient temperature from the temperature of the raw materials, the reaction heat and the temperature increase due to energy input during mixing, wherein the mixture may be heated or cooled as required. Mixing is preferably carried out at the pressure of the ambient atmosphere, i.e. about 900 to 1100 hPa. However, mixing may also be temporarily or continuously carried out under reduced or elevated pressure, for example at 500 to 3000 hPa absolute pressure.

The process A may be performed continuously, discontinuously or semicontinuously, preferably discontinuously.

The reaction of the organylalkoxysilanes (i) with water (ii) in the presence of base (iii) and optionally in solvent (iv)

typically affords mixtures of different organopolysiloxanes (A). Disiloxanes $R_2R^1Si\!-\!O\!-\!SiR_2R^1$, and to a lesser extent low molecular weight or high molecular weight linear or branched structures, such as $R^2Si(OR^3)(OSiR_2R^1)_2$, $R^2Si(OR^3)_2(OSiR_2R^1)$, $R^2Si(OSiR_2R^1)_3$, and $[(R^2SiO_{2/2}(OSiR_2R^1))_n(R^2SiO_{1/2}(OR^3)_2)_2]$ and $[(R^2SiO_{2/2}(OSiR_2R^1))_n(R^2SiO_{1/2}(OSiR_2R^1)(OR^3))_2]$ where n=3-7 or more than 20, or low molecular weight cyclic structures, such as $[R^2SiO_{2/2}(OSiR_2R^1)]_{3-4}$, may also be formed as byproducts, wherein the radicals are as defined above.

Once reaction has been carried out the reaction mixture may either be devolatilized under vacuum or subjected to a preceding aqueous workup. If isolation or enrichment of certain species of the reaction mixture is desired this is preferably effected by crystallization.

The production of organopolysiloxanes (A) may be followed by a further process step, as is preferred to reduce the content of any $(OR^3)$ groups still present, wherein $R^3$ is as defined above. To this end the organopolysiloxanes (A) obtained by reacting the silanes (i) with water (ii) in the presence of bases (iii) and optionally in the presence of organic solvent (iv) may be reacted with at least one organyloxy- or hydroxy-reactive compound (v) in an organic solvent selected from ethers, saturated and aromatic hydrocarbons, for example with monochlorosilanes or in a Piers-Rubinsztajn reaction with reactive silanes in the presence of tris(pentafluorophenyl)borane as catalyst.

Subsequently to the optionally performed additional process step of process A the reaction mixture may either be devolatilized under vacuum or subjected to a preceding aqueous workup. If isolation or enrichment of certain species of the reaction mixture is desired this is preferably effected by crystallization.

The component (B) employed according to the invention may be selected from any desired and hitherto known organosilicon compounds comprising two Si-bonded hydrogen atoms, for example SiH-functional silanes and siloxanes, Coupler (B) is preferably selected from organosilicon compounds containing units of formula

(IX), wherein
$R^4$ may be identical or different and represents a monovalent or divalent, SiC-bonded, optionally substituted, saturated hydrocarbon radical,
$R^5$ may be identical or different and represents a monovalent or divalent, SiC-bonded, optionally substituted, aliphatically saturated aromatic hydrocarbon radical,
e is 0, 1, 2 or 3, preferably 0, 1 or 2, more preferably 1 or 2,
f is 0, 1 or 2, preferably 1 or 2, and
g is 0, 1 or 2, preferably 1 or 2,
with the proviso that e+f+g≤4 and two Si-bonded hydrogen atoms are present per molecule.

Couplers (B) preferably contain per molecule at least one radical $R^5$, more preferably 1 to 4, and in particular 1 to 2, radicals $R^5$.

Couplers (B) preferably contain per molecule at least one radical $R^5$ which is a divalent, SiC-bonded, aliphatically saturated aromatic hydrocarbon radical which in particular connects two units of formula (IX) to one another.

Examples of radicals $R^4$ are alkyl radicals such as methyl, ethyl, n-propyl, iso-propyl, 1-n-butyl, 2-n-butyl, iso-butyl, tert-butyl, n-pentyl, iso-pentyl, neo-pentyl, and tert-pentyl radicals; hexyl radicals such as the n-hexyl radical; heptyl radicals such as the n-heptyl radical; octyl radicals such as the n-octyl radical and iso-octyl radicals such as the 2,4,4-trimethylpentyl radical and the 2,2,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl and methylcyclohexyl radicals, and also the methylene, ethylene, dimethylmethylene, methylmethylene, phenylmethylene and diphenylmethylene radicals, preferably the methyl radical.

Examples of radicals $R^5$ are aryl radicals such as the phenyl, biphenyl, naphthyl, anthryl and phenanthryl radicals; alkaryl radicals such as the o-, m-, p-tolyl radicals xylyl radicals and ethylphenyl radicals; and aralkyl radicals such as the benzyl radical, the α- and β-phenylethyl radicals, the 2-(2-methylphenyl)ethyl radical, 2-(3-methylphenyl)ethyl radical and 2-(4-methylphenyl)ethyl radical, the 2-phenylpropenyl radical and the 2-phenylisopropenyl radical, and also the phenylene and methyl(phenyl)methylene radicals, phenylmethylene and diphenylmethylene radicals, $-(C_6H_4)-CH_2-(C_6H_4)-$, $-(C_6H_4)-C(CH_3)_2-(C_6H_4)-$, $-(C_6H_4)-C(CH_3)H-(C_6H_4)-$, $-(C_6H_4)-C(C_6H_5)H-(C_6H_4)-$, $-(C_6H_4)-C(C_6H_5)Me-(C_6H_4)-$, $-(C_6H_4)-C(C_6H_5)_2-(C_6H_4)-$, $-(C_6H_4)-O-(C_6H_4)-$, $-(C_6H_4)-S-(C_6H_4)-$, and also mono- or divalent biphenyl, naphthalene, anthracene or phenanthrene radicals, wherein the phenyl radical, the divalent biphenyl radical or the phenylene radical are preferred.

Examples of couplers (B) are phenylsilanes, such as diphenylsilane (CAS 775-12-2) or methyl(phenyl)silane (CAS 766-08-5); couplers having siloxane units, such as 1,1,3-trimethyl-3-phenyldisiloxane, 1,5-dimethyl-1,3,3,5-tetraphenyltrisiloxane, 1,3-dimethyl-1,3-diphenyl-disiloxane (CAS 6689-22-1), 1,1,3,3-tetraphenyl-disiloxane, 1,1,5,5-tetramethyl-3,3-diphenyltrisiloxane, 1,1,3,5,5-pentamethyl-3-phenyltrisiloxane, 1,1,3,3-tetramethyldisiloxane, 1,1,3,3,5,5-hexamethyltrisiloxane; couplers having phenylene and divalent biphenyl units, such as 1,4-bis(dimethylsilyl)benzene (CAS 2488-01-9), 1,4-bis(methylphenylsilyl)benzene, 4,4'-bis(dimethylsilyl)-1,1'-biphenyl, bis(4'-(dimethylsilyl)-[1,1'-biphenyl]-4-yl)dimethylsilane, 4,4'-bis(methylphenylsilyl)-1,1'-biphenyl, bis(4-(dimethylsilyl)phenyl)dimethylsilane, bis(4-(dimethylsilyl)phenyl)(ethyl)methylsilane, bis(4-(dimethylsilyl)phenyl)diethylsilane, bis(4-(dimethylsilyl)phenyl)di-n-butylsilane, bis(4-(dimethylsilyl)phenyl)di-tert-butylsilane, bis(4-(dimethylsilyl)phenyl)dipropylsilane, bis(4-(dimethylsilyl)phenyl)di-iso-propylsilane, bis(4-(dimethylsilyl)phenyl)methane, 2,2-bis(4-(dimethylsilyl)phenyl)propane; couplers comprising divalent polycyclic aromatic hydrocarbons, such as 9,10-bis(dimethylsilyl)anthracene, 1,4-bis(dimethylsilyl)naphthalene, 1,5-bis(dimethylsilyl)naphthalene, 2,6-bis(dimethylsilyl)naphthalene, 1,8-bis(dimethylsilyl)naphthalene, 1,6-bis(dimethylsilyl)naphthalene or 1,7-bis(dimethylsilyl)naphthalene; and bis(4-(dimethylsilyl)phenyl) ether and bis(4-(dimethylsilyl)phenyl)sulfide.

Coupler (B) is preferably selected from organosilicon compounds such as diphenylsilane, 1,3-dimethyl-1,3-diphenyl-disiloxane, 1,1,5,5-tetramethyl-3,3-diphenyltrisiloxane, 1,4-bis(dimethylsilyl)benzene, 4,4'-bis(dimethylsilyl)-1,1'-biphenyl, bis(4'-(dimethylsilyl)-[1,1'-biphenyl]-4-yl)dimethylsilane, bis(4-(dimethylsilyl)phenyl)dimethylsilane, bis(4-(dimethylsilyl)phenyl)methane, bis(4-(dimethylsilyl)phenyl) ether or bis(4-(dimethylsilyl)phenyl) sulfide.

Organosilicon component (B) is more preferably diphenylsilane, 1,4-bis(dimethylsilyl)benzene, 1,3-dimethyl-1,3- diphenyl-disiloxane, 1,1,5,5-tetramethyl-3,3-diphenyltrisiloxane, 4,4'-bis(dimethylsilyl)-1,1'-biphenyl, bis(4-(dimethylsilyl)phenyl)dimethylsilane, especially 1,4-bis(dimethylsilyl)benzene, 4,4'-bis(dimethylsilyl)-1,1'-biphenyl, 1,3-dimethyl-1,3-diphenyldisiloxane or bis(4-(dimethylsilyl)phenyl)dimethylsilane.

Coupler (B) is selected from commercially available products or may be produced by processes commonly used in chemistry, for example by Grignard reaction.

In the compositions according to the invention components (A), (B) and optionally (F) are employed in amounts such that the molar ratio of Si-bonded hydrogen to aliphatically unsaturated carbon-carbon multiple bonds is by preference 0.80 to 1.20, more preferably 0.85 to 1.10, yet more preferably 0.90 to 1.10, and in particular 0.95 to 1.05.

Employable catalysts (C) include all catalysts that have also previously been used for addition of Si-bonded hydrogen onto aliphatic multiple bonds.

Examples of catalysts (C) are metals such as platinum, rhodium, palladium, ruthenium and iridium, preferably platinum, which may optionally be fixed on finely divided support materials, such as activated carbon, aluminum oxide or silicon dioxide.

Preferably employed catalysts (C) are platinum and compounds and complexes thereof.

Examples of such platinum catalysts (C) are metallic and finely divided platinum, which may be arranged on supports, such as silicon dioxide, aluminum oxide or activated carbon, compounds or complexes of platinum, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without a content of detectable inorganically bonded halogen, bis(gamma-picoline)platinum dichloride, trimethylenedipyridineplatinum dichloride, dicyclopentadieneplatinum dichloride, dimethylsulfoxidethyleneplatininum(II) dichloride and also reaction products of platinum tetrachloride with olefin and primary amine or secondary amine or primary and secondary amine, such as the reaction product of platinum tetrachloride dissolved in 1-octene with sec-butylamine, or ammonium-platinum complexes according to EP-B 110 370 and platinum complexes with N-heterocyclic carbenes (NHC) such as [1,3-bis(2,6-diisopropylphenyl)imidazol-2-ylidene][1,3-divinyl-1,1,3,3-tetramethyldisiloxane]platinum(0) (CAS 849830-54-2), [1,3-bis(2,6-diisopropylphenyl)imidazolidinylidene][1,3-divinyl-1,1,3,3-tetramethyldisiloxane]platinum(0) (CAS 873311-51-4), [1,3-bis(cyclohexyl)imidazol-2-ylidene][1,3-divinyl-1,1,3,3-tetramethyldisiloxane]platinum(0) (CAS 400758-55-6), 1,3-bis(2,4,6-trimethylphenyl)-3,4,5,6-tetrahydropyrimidin-1-iumplatinum(divinyltetramethyldisiloxane), 1,3-bis(2,6-dimethylphenyl)-3,4,5,6-tetrahydropyrimidin-1-iumplatinum(divinyltetramethyldisiloxane) and 1,3-bis(2-methylphenyl)-3,4,5,6-tetrahydropyrimidin-1-iumplatinum(divinyltetramethyldisiloxane).

Preferably employed as catalyst (C) is the platinum-1,3-divinyl-1,1,3,3-tetramethyldisiloxane complex (CAS 68478-92-2) which has long been known as Karstedt's catalyst in the literature.

Catalyst (C) is employed in the preparations according to the invention by preference in amounts of 1 to 5000 ppm by weight (parts by weight per million parts by weight), more preferably in amounts of 1 to 2000 ppm by weight, and in particular in amounts of 1 to 500 ppm by weight, in each case calculated as elemental metal, preferably elemental platinum, and based on the total weight of components (A) and optionally (F).

As catalyst (C) the preparations according to the invention most preferably employ Karstedt's catalyst (CAS 68478-92-2) in amounts of 5 to 100 ppm by weight, calculated as elemental platinum and based on the total weight of the components (A) and optionally (F).

In a preferred embodiment catalyst (C) is employed in admixture with inhibitor (D) and optionally with organic solvent (E), more preferably in admixture with linear vinyl-terminated polydimethylsiloxanes (D) and optionally organic solvent (E).

In addition to the components (A), (B), (C) and optionally (E) the compositions according to the invention may contain further substances distinct from components (A), (B), (C) and (E), for example inhibitors (D), reactive plasticizers (F) and additives (G).

The compositions according to the invention may contain inhibitors (D) including those which have hitherto also been used in hydrosilylation-crosslinkable compositions and retard the addition of Si-bonded hydrogen onto aliphatic carbon-carbon multiple bonds at room temperature or which may be used to specifically adjust the processing time and crosslinking rate.

Examples of optionally employed inhibitors (D) are acetylenic alcohols, such as 1-ethynylcyclohexan-1-ol, 3,5-dimethyl-1-hexyn-3-ol, 2-phenyl-3-butyn-2-ol and 2-methyl-3-butyn-2-ol, linear vinyl-terminated polydimethylsiloxanes, trialkylcyanurates, maleates, such as diallyl maleate, dimethyl maleate and bis(2-methoxy-1-methylethyl)maleate, alkyl fumarates such as diethyl fumarate and diallyl fumarate, organic hydroperoxides, such as cumene hydroperoxide, tert-butyl hydroperoxide and pinane hydroperoxide, organic peroxides, organic sulfoxides, organic amines and amides, phosphines and phosphites, phosphonites, phosphinites, nitriles, diaziridines and oximes and also alkylthioureas, thiuram monosulfides and disulfides.

Preferred examples of optionally employed inhibitors (D) are acetylenic alcohols, such as 1-ethynylcyclohexan-1-ol, 3,5-dimethyl-1-hexyn-3-ol, 2-phenyl-3-butyn-2-ol and 2-methyl-3-butyn-2-ol, linear vinyl-terminated polydimethylsiloxanes, trialkylcyanurates, maleates, such as diallyl maleate, dimethyl maleate and bis(2-methoxy-1-methylethyl)maleate, alkyl fumarates such as diethyl fumarate and diallyl fumarate, organic hydroperoxides, such as cumene hydroperoxide, tert-butyl hydroperoxide and pinane hydroperoxide, organic peroxides, phosphines and phosphites, phosphonites, phosphinites, diaziridines and oximes and also alkylthioureas, thiuram monosulfides and disulfides.

The optionally employed inhibitors (D) are more preferably 1-ethynylcyclohexan-1-ol or thiuram monosulfides, in particular thiuram monosulfides.

When inhibitor (D) is employed the amounts employed are preferably 5 to 5000 ppm by weight, more preferably from 10 to 2000 ppm by weight, and in particular from 20 to 1000 ppm by weight, in each case based on the total weight of the components (A) and optionally (F). The compositions according to the invention preferably contain inhibitor (D).

The addition-crosslinking composition according to the invention may be adjusted such that after combining all of the individual components forming said composition at temperatures of −50° C. to 30° C. it is storage stable over relatively long periods, in particular several weeks to at least 2 months, preferably up to at least 3 months, more preferably up to at least 4 months, and in particular up to at least 5 months.

It is likewise possible to adjust the preparations according to the invention such that after combining all of the components forming said preparations only a limited working time (potlife) until onset of curing remains. This is achieved either by adding no inhibitor or by employing for example 1-ethynylcyclohexan-1-ol, 2-methyl-3-butyn-2-ol, 3-methyl-1-pentyn-3-ol, 2,5-dimethyl-3-hexyn-2,5-diol, 2,5-dimethyl-1-hexyn-3-ol or 3,7-dimethyloct-1-yn-6-en-3-ol which have a less pronounced inhibiting effect on the addition reaction, wherein this list of inhibitors is to be understood as being merely exemplary and not limiting.

Examples of optionally employed solvent (E) are ketones such as methyl isobutyl ketone, methyl ethyl ketone, methyl isoamyl ketone, diisobutyl ketone, acetone, cyclohexanone, diethyl ketone, 2-hexanone, acetylacetone and butane-2,3-dione; esters such as ethyl acetate, ethylene glycol diacetate, gamma-butyrolactone, 2-methoxypropyl acetate (MPA), di(propylene glycol) dibenzoate and ethyl(ethoxy) propionate, methyl acetoacetate, ethyl acetoacetate, n-butyl acetoacetate, methyl acetate, n-, sec- or tert-butyl acetate, butyl 2-hydroxypropionate, ethyl propionate, ethyl 2-hydroxypropionate and dimethyl maleate; amides, such as N,N-dimethylformamide, N,N-dimethylacetamide, N-methyl-2-pyrrolidone and N-ethyl-2-pyrrolidone; nitriles such as acetonitrile, propionitrile, 3-methoxypropionitrile; acetals such as methylal, ethylhexylal, butylal, 1,3-dioxolane, 1,3,5-trioxane and glycerol formal; ethers, such as methyl tert-butyl ether, tetrahydrofuran (THF), diphenyl ether, allylphenyl ether, benzylphenyl ether, cyclohexylphenyl ether, methylphenyl ether, tetrahydropyran, 4-methyltetrahydropyran, butylphenyl ether, dibenzyl ether, anisole, 2-methyltetrahyrofuran, cyclopentyl methyl ether, dibutyl ether, diethyl ether, mono-, di-, tri- or tetraethylene glycol dimethyl ether, ethylene glycol dibutyl ether, ethyl methyl ether and 1,4-dioxane; sulfoxides such as dimethyl sulfoxide, dipropyl sulfoxide and dibutyl sulfoxide; saturated hydrocarbons such as n-pentane, n-hexane, cyclohexane, n-heptane, n-octane and isomeric octanes such as 2-ethylhexane, 2,4,4-trimethylpentane, 2,2,4-trimethylpentane and 2-methylheptane, and also mixtures of saturated hydrocarbons having boiling ranges between 60-300° C., such as are obtainable under the trade names Exxsol™, Isopar™, Hydroseal® or Shellsol®; aromatic hydrocarbons such as benzene, toluene, o-, m- or p-xylene, solvent naphtha and mesitylene; acetals such as methylal, ethylhexylal, butylal, 1,3-dioxolane and glycerol formal; carbonates such as 1,3-dioxolan-2-one, diethyl carbonate, dimethyl carbonate, dipropyl carbonate, propylene glycol carbonate and ethylene carbonate; chloroform; dichloromethane; and mixtures thereof.

When the compositions according to the invention contain solvent (E), this is preferably selected from ethers, aromatic hydrocarbons or saturated hydrocarbons, more preferably toluene.

When the compositions according to the invention contain solvent (E) the amounts are preferably 0.001 to 30 parts by weight, particularly preferably 0.001 to 20 parts by weight, in particular 0.01 to 10 parts by weight, in each case based on 100 parts by weight of the sum of the components (A), (B) and (F). The compositions according to the invention preferably contain no solvent (E).

Examples of optionally employed reactive plasticizers (F) are cyclic siloxanes comprising 3 to 6 silicon atoms and reactive aliphatic carbon-carbon multiple bonds, for example vinyl radicals, for example 1,3,5,7-tetramethyl-1,3,5,7-tetravinylcyclotetrasiloxane, 1,3,5-trimethyl-1,3,5-trivinylcyclotrisiloxane, 1,3,5,7-triphenyl-1,3,5,7-trivinylcyclotetrasiloxane or 1,3,5,7-tetraphenyl-1,3,5,7-tetravinylcyclotetrasiloxane.

When the compositions according to the invention contain component (F) the amounts employed are by preference 0.1 to 200 parts by weight, more preferably 5 to 100 parts by weight, yet more preferably 5 to 50 parts by weight, and in particular 10 to 30 parts by weight, in each case based on 100 parts by weight of component (A).

Components (G) optionally employed according to the invention are selected from plasticizers, adhesion promoters, dyes, inorganic and organic pigments, fluorescent dyes, fungicides, fragrances, dispersing agents, rheology additives, corrosion inhibitors, oxidation inhibitors, light stabilizers, heat stabilizers, flame-retarding agents, agents for influencing tack, agents for influencing electrical properties, agents for improving thermal conductivity; modifiers for increasing strength, glass transition temperature and/or fracture toughness; reinforcing and non-reinforcing fillers; and also fiber fabrics made of glass, carbon or plastic; or combinations thereof.

When the compositions according to the invention contain component (G), these are preferably selected from oxidation inhibitors, light stabilizers, heat stabilizers, agents for influencing electrical properties, agents for improving thermal conductivity; modifiers for increasing strength, glass transition temperature and/or fracture toughness; reinforcing and non-reinforcing fillers; as well as fiber fabrics made of glass, carbon or plastic; or combinations thereof, more preferably oxidation inhibitors, heat stabilizers, modifiers for increasing strength, glass transition temperature and/or fracture toughness; reinforcing and non-reinforcing fillers; as well as fiber fabrics made of glass, carbon or plastic; or combinations thereof.

When the compositions according to the invention contain component (G) the amounts employed are preferably 0.1 to 200 parts by weight, more preferably 0.1 to 100 parts by weight, and in particular 0.1 to 50 parts by weight, in each case based on 100 parts by weight of the sum of the components (A) and (B). The compositions according to the invention preferably contain component (G).

The compositions according to the invention are by preference those containing (A) organopolysiloxanes,
(B) coupler,
(C) catalyst,
optionally (E) solvent,
(D) inhibitor,
optionally (F) reactive plasticizer and
optionally (G) further constituents.

The compositions according to the invention are preferably those containing (A) organopolysiloxanes,
(B) coupler,
(C) catalyst,
optionally (E) solvent,
(D) inhibitor,
(F) reactive plasticizer and
optionally (G) further constituents.

The compositions according to the invention are particularly preferably those containing (A) organopolysiloxane
(B) coupler,
(C) catalyst,
(D) inhibitor, optionally (E) solvent,
(F) reactive plasticizer and
(G) further constituents.

The compositions according to the invention are in particular those containing
(A) organopolysiloxanes,
(B) coupler, which contains per molecule at least one radical $R^5$ which is a divalent, SiC-bonded, optionally substituted, aliphatically saturated aromatic hydrocarbon radical which in particular connects two units of formula (IX) to one another,
(C) catalyst,
optionally (E) solvent,
(D) inhibitor,
(F) reactive plasticizer and
(G) further constituents.

The compositions according to the invention are very particularly preferably those containing
(A) organopolysiloxanes,
(B) coupler, which contains per molecule at least one radical $R^5$ which is a divalent, SiC-bonded, optionally substituted, aliphatically saturated aromatic hydrocarbon radical which in particular connects two units of formula (IX) to one another,
(C) catalyst,
optionally (E) solvent,
(D) inhibitor,
(F) reactive plasticizer and
(G) further constituents.

In addition to the components (A) to (G) and any by-products formed, such as disiloxanes or low molecular weight or high molecular weight linear or branched structures and low molecular weight cyclic structures, the compositions according to the invention preferably contain no further constituents.

The components employed according to the invention may in each case be a single type of such a component or a mixture of at least two types of a respective component.

The compositions according to the invention have a viscosity of 10 to 500,000 mPa·s, preferably of 50 to 100,000 mPa·s, more preferably of 100 to 50,000 mPa·s, in each case at 60° C.

Production of the compositions according to the invention may be carried out according to known processes such as for example by mixing the individual components in any desired sequence and in hitherto known fashion.

The present invention further provides a process for producing the compositions according to the invention by mixing the individual components.

In the process according to the invention the mixing is preferably carried out at temperatures in the range from 10° C. to 40° C. However, if desired the mixing may also be carried out at higher temperatures, for example at temperatures in the range from 40° C. to 100° C., wherein an inhibitor (D) is preferably added to the composition. It is preferable to perform mixing at the temperature which results upon mixing at ambient temperature from the temperature of the raw materials plus the temperature increase due to the energy input during mixing, wherein heating or cooling may be performed as required.

Mixing may be carried out at ambient atmospheric pressure, i.e. about 900 to 1100 hPa. It is further possible to preform mixing temporarily or continuously under reduced pressure, for example at 30 to 500 hPa absolute pressure, to remove volatile compounds and/or air or to mix at elevated pressure, such as pressures between 1100 hPa and 3000 hPa absolute pressure, in particular in continuous mode, when for example these pressures are brought about in closed systems by the pressure during pumping and by the vapor pressure of the employed materials at elevated temperatures.

The process according to the invention may be performed continuously, discontinuously or semicontinuously, preferably discontinuously.

In a preferred embodiment of the process according to the invention for producing the compositions the constituents (A), (B) and (C) and the optionally employed components (E), (D), (F) and (G) are mixed in any desired sequence.

It is particularly preferable when the process according to the invention comprises premixing the components (A) and (B) and the optionally employed components (D), (E), (F) and (G) in any desired sequence and then homogenizing with component (C), optionally as a mixture with components (D) and (E).

In a preferred embodiment after production component (A) is subjected to a further processing step to reduce the residual ($OR^3$) groups; component (A) is then premixed with component (B) and optionally with components (D), (E), (F) and (G) and subsequently homogenized with component (C), optionally as a mixture with components (D) and (E).

The mixtures according to the invention/produced according to the invention are preferably degassed before curing.

Crosslinking according to the invention is preferably carried out at temperatures in the range from 50° C. to 270° C., particularly preferably from 70° C. to 200° C., especially from 140° C. to 200° C. The crosslinking according to the invention is more preferably initially carried out at temperatures of 100° C. to 200° C. followed by a post-curing step at 210° C. to 270° C.

The crosslinking according to the invention is preferably carried out at ambient atmospheric pressure, i.e. about 900 to 1100 hPa, but may also be carried out at elevated pressure, i.e. from 1200 hPa to 10 MPa.

The crosslinking according to the invention may be carried out in an air atmosphere or protective gas atmosphere, such as nitrogen or argon. The crosslinking according to the invention is preferably carried out at temperatures up to 220° C. in an air atmosphere and at temperatures above 220° C. in a protective gas atmosphere.

The present invention further provides molded articles produced by crosslinking the compositions according to the invention.

The molded articles according to the invention preferably have an elastic modulus measured at 23° C. of more than 0.5 GPa, more preferably more than 0.8 GPa, yet more preferably more than 1.0 GPa, and in particular more than 1.3 GPa.

The molded articles according to the invention preferably have a flexural strength $\sigma_{fM}$ measured at 23° C. of more than 20 MPa, preferably more than 30 MPa, more preferably more than 40 MPa, especially more than 45 MPa.

The molded articles according to the invention by preference have a tan delta$_{max}$ of at least 0.400, more preferably of at least 0.500, yet more preferably of at least 0.600, especially of at least 0.700.

The molded articles according to the invention preferably have a full width at half maximum ≤40° C., more preferably ≤35° C., most preferably ≤30° C.

In compressive testing, measured at 25° C., the molded articles according to the invention preferably have a yield stress $\sigma_y$, defined as the stress at which for the first time an increase in compression is not accompanied by an increase in stress (see DIN EN ISO 604: 2003-12, chapter 3.3.1) and identifiable by a stress maximum in the stress/compressive strain curve (see DIN EN ISO 604: 2003-12, chapter 4, FIG.

1; curve a) followed by a drop in stress for further increase in compression after $\sigma_y$ (strain softening).

The molded articles according to the invention by preference have a flow ratio measured at 25° C. of less than 1.40, preferably less than 1.30, particularly preferably less than 1.20, especially less than 1.10.

The molded articles according to the invention have the advantage that they combine high strength, i.e. high elastic moduli and flexural strength values, with good flow characteristics, i.e. a low flow $\sigma_{20\%}:\sigma_y$, and a homogeneous network structure identifiable by a high damping maximum tan delta$_{max}$ at the glass transition temperature (Tg) and a low full width at half maximum.

The organopolysiloxanes (A) produced according to the invention have the advantage that they are easy to produce.

The compositions according to the invention moreover have the advantage that they are liquid and easily processable at 60° C.

EXEMPLARY EMBODIMENTS

Production of Cylindrical Sample Bodies

To perform the DMA, the flexural strength measurements and compressive measurements the sample bodies were produced from cylindrical vulcanizates. The cylindrical vulcanizates were produced in stainless steel tubes having length×internal diameter measurements=150 mm×10 mm which were onesidedly sealed with a screwtop cap made of stainless steel. To prevent adhesion of the organopolysiloxane composition, the inside of the screwtop contained a lid seal made of polytetrafluoroethylene; the inner surfaces of the stainless steel tubes were sparingly wetted with WACKER® SILICONE PASTE P using an appropriately sized test tube brush before filling with the organopolysiloxane compositions and the tubes were subsequently stored at 180° C. for 2 hours. The tubes were then filled with the organopolysiloxane composition and cured in a recirculating air oven in a nitrogen atmosphere for 72 hours at 180° C. and then for a further 2 hours at 250° C. The stainless steel tubes were stood upright with the open side pointing upward. The sample bodies were then allowed to cool to 23° C. in the tubes before the sample bodies were demolded. The uppermost 20 mm of the sample body side which was uncovered during curing was discarded from further use.

Dynamic Mechanical Analysis (DMA)

Measurement parameters:
Instrument: ARES rheometer (TA-Instruments)
Temperature range: −100° C.-300° C.
Heating rate: 4 K/min with nitrogen purge
Frequency: 1 Hz
Strain: Initially 0.03%, automatically increased if measurement signal below threshold value For the investigations rectangular test specimens having the dimensions length×width×height=40 mm×6 mm×3 mm were produced from the cylindrical sample bodies; the resulting clamping length was 25 mm.

In the present document tan delta corresponds to the damping, i.e. the tangent of the phase angle or the ratio of loss modulus G" to storage modulus G'; tan delta$_{max}$ is defined as the damping maximum (=maximum value of the tangent delta curve) tan delta at the glass transition temperature Tg.

In the present document the full width at half maximum is defined as the peak width of the tan delta curve in ° C. at tan delta$_{max}$/2.

The value for tan delta$_{max}$ reported in Table 1 was rounded to the third decimal place and the reported value for the full width at half maximum was rounded to the nearest integer, in each case according to DIN 1333:1992-02 section 4.

Compression Test

In the context of the present invention compression properties (yield stress) were carried out according to the standard DIN EN ISO 604:2003-12.

Measurement parameters:
Instrument: Instron 3369
Load cell: 50 kN
Compression piston 50 mm
Test speed: 1 mm/min
Temperature: 25° C., 28% rel. hum.
Initial load: 40 N
Lubricant: none Sample preparation: For the investigations cylindrical test specimens having a diameter of 9.5 mm and having a height of 17 mm were produced. The compression test was performed on 3 test specimens of a sample body. The sample bodies were compressed to about 4.5 mm compression, i.e. about 26% based on initial height, and underwent practically ideal barrel-shaped (bulbous) deformation until completion of the measurement. The flow ratio, defined as the quotient of compressive stress σ in MPa at 20% compression and the yield stress $\sigma_y$ (see DIN EN ISO 604:2003-12, Chapter 3.3.1), was used to assess the material flow characteristics. The value for the flow ratio reported in Table 1 corresponds to the respective average value of the three individual measurements rounded to the second decimal place according to DIN 1333:1992-02 Section 4.

Flexural Strength

In the present invention the flexural strength was measured according to ISO 178:2011-04 method A with a test speed of 5 ram/min at a support distance of 60 mm. The measurements were performed at 23° C. and 50% relative humidity. The preferred procedure is as follows: Cylindrical test specimens having dimensions of length×diameter=100 mm×9.5 mm were used. The measurements were performed on 5 test specimens in each case. The flexural strength $\sigma_{fM}$ (maximum flexural stress borne by the sample body during the test (see ISO 178:2011-04, page 6, chapter 3.4)) was calculated according to the equation $$\sigma_{fm} = \frac{6 \times L \times \sigma_f}{\pi \times \emptyset^3},$$

wherein L is the support distance of 60 mm, $\sigma_f$ is the measured flexural stress in Newtons and Ø is the sample body diameter in mm. The flexural elastic modulus $E_f$ was calculated according to the equation $$E_f = \frac{L^3 \times (\sigma_{f2} - \sigma_{f1})}{0.15 \text{ mm} \times \pi \times \emptyset^4},$$

wherein L is the support distance of 60 mm, $\sigma_{f1}$ is the measured flexural stress at 0.10 mm deflection in kilonewtons (kN), $\sigma_{f2}$ is the measured flexural stress at 0.25 mm deflection in kilonewtons (kN) and Ø is the sample body diameter in mm. The value reported in Table 1 for the flexural strength $\sigma_{fM}$ in MPa and the flexural elastic modulus $E_f$ in GPa corresponds to the respective average value of the individual measurements rounded to the nearest integer (flexural elastic modulus) or to one decimal place (flexural strength) according to DIN 1333:1992-02 section 4.

Molar Masses

In the context of the present invention the number-average molecular weight Mn and the weight-average molecular weight Mw in each case in units of g/mol and rounded to the nearest ten according to DIN 1333:1992-02 section 4 are determined by size exclusion chromatography (SEC/GPC) according to DIN 55672-1/ISO 160414-1 and ISO 160414-3 by calibration against polystyrene standards of a column assembly based on polystyrene-co-divinylbenzene as the stationary phase and composed of three columns having different pore size distributions in the sequence 10 000 Å, 500 Å and 100 Å with an exclusion size of greater than 450 000 g/mol. Phenyl-containing components are determined with a THF eluent and non-phenyl-containing components are determined with a toluene eluent. The analyses are carried out at a column temperature of 45±1° C. using a refractive index detector.

In the examples which follow all parts and percentages are by weight unless otherwise stated. Unless otherwise stated the examples which follow are performed at ambient pressure, i.e. at about 1013 hPa, and at room temperature, i.e. about 23° C., or at the temperature attained on combining the reactants at room temperature without additional heating or cooling.

In the following

Me represents methyl, Vi represents vinyl, Et represents ethyl, Ph represents phenyl.

Production of Siloxane Component 1

100 g (504 mmol) of phenyltrimethoxysilane (CAS 2996-92-1; commercially available under the name GENIOSIL® XL 70 from Wacker Chemie AG, Munich, Germany) were mixed with 30.13 g (1673 mmol) of deionized water, then sufficient anhydrous acetone (71 g) to form a homogeneous solution was added. The mixture was subsequently admixed with 0.60 g (4.4 mmol) of solid potassium carbonate (CAS 584-08-7; commercially available from Sigma-Aldrich Chemie GmbH, Steinheim, Germany) and after 45 minutes of stirring 21 g (161 mmol) of vinyldimethylethoxysilane (CAS 5356-83-2; commercially available from abcr GmbH, Karlsruhe, Germany) were added. The mixture was stirred at 23° C. for 12 hours, 100 ml of trichloromethane were added and the mixture was then extracted 3× with 200 ml of deionized water in each case. The organic phase was separated and dried over magnesium sulfate. The volatile constituents were then distilled off and the residue was devolatilized for 1 hour at 100° C. and 1 mbar. Cooling to 23° C. afforded 65.11 g of a colorless solid having the average composition $(PhSiO_{3/2})_{0.76}(PhSi(OH)O_{2/2})_{0.04}(PhSi(OMe)O_{2/2})_{0.01}(ViMe_2SiO_{1/2})_{0.19}$, a weight-average Mw of 1420 g/mol, a number-average Mn of 1220 g/mol and a polydispersity Mw/Mn of 1.17.

Under a nitrogen atmosphere 65.00 g of this solid were dissolved in 200 mL of anhydrous toluene (CAS 108-88-3; commercially available from Sigma-Aldrich Chemie GmbH, Steinheim, Germany). Subsequently, a mixture of 4.07 g of 1,3-divinyltetramethyldisilazane (CAS 2627-95-4; commercially available from Sigma-Aldrich Chemie GmbH, Steinheim, Germany) and 2.63 g of chloro(dimethyl)vinylsilane (CAS 1719-58-0; commercially available from Sigma-Aldrich Chemie GmbH, Steinheim, Germany) was added; the mixture was stirred at 23° C. for 12 hours and then at 70° C. for 1 hour. After cooling to 23° C. the mixture was filtered, the filtrate was washed 3× with 150 ml of deionized water in each case and subsequently dried over sodium sulfate. Afterwards, the volatile constituents were distilled off and the residue was devolatilized for 1 hour at 80° C. and 1 mbar. Cooling to 23° C. afforded 61.31 g of a colorless solid having the average composition $(PhSiO_{3/2})_{0.78}(PhSi(OMe)O_{2/2})_{0.01}(ViMe_2SiO_{1/2})_{0.21}$, a weight-average Mw of 1480 g/mol, a number-average Mn of 1240 g/mol and a polydispersity Mw/Mn of 1.19.

Example 1

50.00 g of organopolysiloxane 1 were mixed with 8.78 g of 1,4-bis(dimethylsilyl)benzene (CAS 2488-01-9; commercially available from abcr GmbH, Karlsruhe, Germany) and 0.10 g of 1-ethynylcyclohexan-1-ol (CAS 78-27-3, commercially available from Sigma-Aldrich Chemie GmbH, Steinheim, Germany) and homogenized in an ultrasonic bath at 60° C. 0.05 g of platinum catalyst (commercially available under the name WACKER® KATALYSATOR OL from Wacker Chemie AG, Munich, Germany) was then added and homogeneously incorporated at 50° C. The mixture was then degassed to 100 mPa at 50° C. and, after breaking the vacuum with nitrogen, immediately poured into the stainless steel cylinder molds preheated to 100° C. and cured. The results of the measurements are summarized in Table 1.

Example 2

50.00 g of organopolysiloxane 1 were mixed with 10.00 g of 1,3,5,7-tetramethyl-1,3,5,7-tetravinylcyclotetrasiloxane (CAS 2554-06-5, commercially available from Sigma-Aldrich Chemie GmbH, Steinheim, Germany), 20.62 g of 1,4-bis(dimethylsilyl)benzene and 0.10 g of 1-ethynylcyclohexan-1-ol and homogenized in an ultrasonic bath at 50° C. 0.05 g of WACKER® KATALYSATOR OL platinum catalyst was then added and homogeneously incorporated at ambient temperature. The mixture was then degassed to 100 mPa and, after breaking the vacuum with nitrogen, immediately poured into the stainless steel cylinder molds preheated to 100° C. and cured. The results of the measurements are summarized in Table 1.

TABLE 1

| Example | 1 | 2 |
|---|---|---|
| Flexural elastic modulus at 23° C. [GPa] | 1.3 | 1.1 |
| Flexural strength $\sigma_{fM}$ at 23° C. [MPa] | 45 | 47 |
| tan delta$_{max}$ | 0.981 | 0.891 |
| Full width at half maximum [° C.] | 27 | 21 |
| Flow ratio $\sigma_{20\%}:\sigma_y$ at 25° C. | 0.99 | 1.03 |

The invention claimed is:
1. A hydrosilylation-crosslinkable composition, comprising:
(A) solid organopolysiloxanes consisting of units of formulae

$$R_2R^1SiO_{1/2} \qquad (V),$$

$$R^2SiO_{3/2} \qquad (VI)$$

and units selected from the group consisting of units of formulae $$R^2(OR^3)SiO_{2/2} \qquad (VII) \text{ and}$$

$$R^2(OR^3)_2SiO_{1/2} \qquad (VIII),$$

wherein
R are identical or different and represent hydrocarbon radicals free from aliphatic carbon-carbon multiple bonds,
$R^1$ are monovalent hydrocarbon radicals having aliphatic carbon-carbon multiple bonds, $R^2$ are aromatic hydrocarbon radicals free from aliphatic carbon-carbon multiple bonds, and
$R^3$ are identical or different and represent hydrogen or alkyl
and with the proviso that
in the organopolysiloxanes (A) the sum of the units of formula (V), based on the sum of all units of formulae (V), (VI), (VII) and (VIII), is 0.15 to 0.24,
in the organopolysiloxanes (A) the sum of the units of formulae (VII) and (VIII), based on the sum of all units of formulae (V), (VI), (VII) and (VIII), is not more than 0.08,
organopolysiloxanes (A) contain an average of 10 to 20 silicon atoms,
organopolysiloxanes (A) have a polydispersity Mw/Mn of 1.05 to 1.40 and a weight-average Mw of 1350 to 1850 g/mol and
organopolysiloxanes (A) have an average number of radicals $R^1$ per molecule, reported in mol($R^1$)/mol, of 1.1 to 3.8,
(B) organosilicon compounds having two Si-bonded hydrogen atoms containing units of formula $$R^4_e H_f R^5_g Si \quad (IX),$$

wherein
$R^4$ are identical or different and represent monovalent, SiC-bonded, optionally substituted, saturated hydrocarbon radicals,
$R^5$ are identical or different and represent monovalent or divalent, SiC-bonded, optionally substituted, aliphatically saturated aromatic hydrocarbon radicals,
e is 0, 1, 2 or 3,
f is 0, 1 or 2 and
g is 0, 1 or 2,
with the proviso that e+f+g=4 and two Si-bonded hydrogen atoms are present per molecule, and
(C) catalysts which promote addition of Si-bonded hydrogen onto an aliphatic multiple bond.

2. The composition of claim 1, wherein the organopolysiloxanes (A) are those produced by reacting
(i) organylalkoxysilanes of formulae $$R_2 R^1(OR^3)Si \quad (III)$$

and $$R^2(OR^3)_3 Si \quad (IV),$$

wherein R, $R^1$, $R^2$ and $R^3$ are as defined above,
with (ii) water in amounts of 1.0 to 10.0 mol, based on 1 mol of organylalkoxysilane (i) of formula (IV),
in the presence of
(iii) base,
in the presence of
(iv) water-miscible organic solvents.

3. The composition of claim 1, wherein the organosilicon compounds (B) are selected from organosilicon compounds containing units of formula (IX) having at least one radical $R^5$.

4. The composition of claim 1, which is a composition containing
(A) organopolysiloxanes,
(B) coupler,
(C) catalyst,
optionally (E) solvent,
(D) inhibitor,
optionally (F) reactive plasticizer, and
optionally (G) further constituents.

5. A process for producing a composition of claim 1, comprising mixing the individual components.

6. The process of claim 5, wherein producing the composition comprises pre-mixing component (A) with component (B) and optionally with components (D), (E), (F) and (G) to form a premixture, and this premixture is subsequently homogenized with component (C), optionally as a mixture with components (D) and (E), wherein component (A), prior to mixing with component (B), has been subjected to a further processing which lowers the content of residual ($OR^3$) groups.

7. A molded article produced by crosslinking a composition of claim 1.

8. The molded article of claim 4, which has an elastic modulus measured at 23° C. of greater than 0.5 GPa.

9. The composition of claim 1, wherein units (VII) and/or (VIII) are present, in a total amount of less than 0.08.

10. The composition of claim 1, wherein units (VII) and/or (VIII) are present, in a total amount of from 0.01 to 0.06.

11. The composition of claim 1, wherein the organopolysiloxanes (A) contain from 0.18 to 0.22 units of the formula (V).

12. The composition of claim 1, wherein in the organopolysiloxanes (A), the units of the formula (V) are selected from the group consisting of siloxy groups of the formula $R_2 R^1 SiO_{1/2}$ wherein R is methyl.

* * * * *